United States Patent
DeMarco et al.

(10) Patent No.: US 7,788,917 B2
(45) Date of Patent: Sep. 7, 2010

(54) METHOD AND SYSTEM FOR FEEDBACK PRESSURE CONTROL

(75) Inventors: Frank Anthony DeMarco, East Peoria, IL (US); Michael G. Cronin, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 222 days.

(21) Appl. No.: 11/711,717

(22) Filed: Feb. 28, 2007

(65) Prior Publication Data

US 2008/0202112 A1 Aug. 28, 2008

(51) Int. Cl.
*F16H 61/46* (2010.01)
*B60K 17/10* (2006.01)

(52) U.S. Cl. .................................. 60/452; 60/445
(58) Field of Classification Search .................. 60/445, 60/452

See application file for complete search history.

(56) References Cited

U.S. PATENT DOCUMENTS

| | | | |
|---|---|---|---|
| 3,665,814 A | 5/1972 | Ankeny | |
| 3,667,225 A | 6/1972 | Karman | |
| 3,700,356 A | 10/1972 | Kubik | |
| 4,040,255 A | 8/1977 | Hara | |
| 4,139,987 A | 2/1979 | Budzich | |
| 4,158,290 A | 6/1979 | Cornell | |
| 4,395,199 A | 7/1983 | Izumi et al. | |
| 4,510,750 A | 4/1985 | Izumi et al. | |
| 4,776,751 A | 10/1988 | Saele | |
| 5,515,829 A | 5/1996 | Wear et al. | |
| 5,567,123 A | 10/1996 | Childress et al. | |
| 6,131,391 A * | 10/2000 | Poorman | 60/452 |
| 6,202,411 B1 * | 3/2001 | Yamashita | 60/445 |
| H1977 H * | 8/2001 | Poorman | 60/445 |
| 6,374,605 B1 * | 4/2002 | Dvorak et al. | 60/452 |
| 6,402,660 B1 | 6/2002 | Cronin et al. | |
| 6,425,450 B1 | 7/2002 | Lansberry | |
| 6,427,110 B1 * | 7/2002 | Manken et al. | 701/93 |
| 6,468,046 B1 | 10/2002 | Du et al. | |
| 6,638,025 B2 | 10/2003 | Blass et al. | |
| 6,883,313 B2 | 4/2005 | Egelja et al. | |
| 7,392,653 B2 * | 7/2008 | Sugano | 60/452 |

(Continued)

FOREIGN PATENT DOCUMENTS

DE 43 16 300 11/1994

(Continued)

OTHER PUBLICATIONS

U.S. Appl. No. 11/269,392, filed Nov. 8, 2005, entitled Apparatus, System, and Method for Controlling a Desired Torque Output.

*Primary Examiner*—Thomas E Lazo
(74) *Attorney, Agent, or Firm*—Finnegan, Henderson, Farabow, Garrett & Dunner LLP

(57) ABSTRACT

A method of controlling a motor includes monitoring a pressure in a circuit supplying a pressurized fluid to the motor, determining a difference between the monitored circuit pressure and a desired circuit pressure, and determining an actuator command for an actuator that is capable of adjusting a pressure of the pressurized fluid supplied to the motor. The actuator command is determined based on the difference between the monitored circuit pressure and the desired circuit pressure, and is independent of a position of the actuator. The method also includes operating the actuator based on the actuator command.

12 Claims, 3 Drawing Sheets

U.S. PATENT DOCUMENTS

| | | |
|---|---|---|
| 2002/0026275 A1 | 2/2002 | Manken et al. |
| 2006/0095163 A1 | 5/2006 | Wear et al. |
| 2006/0182636 A1 | 8/2006 | Ivantysynova et al. |

FOREIGN PATENT DOCUMENTS

| | | |
|---|---|---|
| EP | 0 344 311 | 12/1989 |
| EP | 1 008 785 | 6/2000 |
| EP | 1 260 428 | 11/2002 |
| GB | 1 558 613 | 1/1980 |

\* cited by examiner

METHOD AND SYSTEM FOR FEEDBACK PRESSURE CONTROL

TECHNICAL FIELD

The present disclosure relates generally to a method and system for controlling pressure in a hydraulic system, and more particularly, to a method and system of controlling pressure in a hydraulic system using a feedback pressure.

BACKGROUND

Pumps having a variable displacement capability are commonly used in many different types of hydraulic systems. Some machines, such as, for example, vehicles, commonly include hydraulic pumps that are driven by an engine or motor in the machine to generate a flow of pressurized fluid, such as, for example, oil. The pressurized fluid may be used for any of a number of purposes during the operation of the vehicle. A machine, for example, may use the pressurized fluid to propel the machine around a work site or to move an implement on the machine.

A variable displacement pump is well known in the industry to drive a hydrostatic motor. In a machine having a variable displacement pump and a hydrostatic motor, such as an excavator or a loader, the pump provides fluid to the hydrostatic motor and drives the motor in the forward or reverse direction. The speed of the hydrostatic motor is controlled by varying the displacement of the pump.

A variable displacement pump generally includes a drive shaft, a rotatable cylinder barrel having multiple piston bores, and pistons held against a tiltable swashplate. When the swashplate is tilted relative to a longitudinal axis of the drive shaft, the pistons reciprocate within the piston bores to produce a pumping action. Each piston bore is subject to intake and discharge pressures during each revolution of the cylinder barrel.

The pump may include a mechanism that varies the angle of the swashplate to change the stroke length of the pistons and thereby vary the displacement of the pump. The displacement of the pump may be decreased by changing the angle of the swashplate to shorten the stroke length of the pistons. Alternatively, the displacement of the pump may be increased by changing the angle of the swashplate to increase the stroke length of the pistons.

Similarly, a hydrostatic motor includes an output drive shaft, a rotatable cylinder barrel having multiple piston bores, pistons disposed in the bores, and a swashplate. The pistons reciprocate within the piston bores to produce a pumping action. Each piston bore is subject to intake and discharge pressures during each revolution of the cylinder barrel. The pumping action by the pistons rotates the cylinder barrel and the output drive shaft, thereby providing a motor output torque.

The amount of pressurized fluid required from a variable displacement pump may vary depending upon the particular operating conditions of the system or vehicle that relies upon the pump. In a vehicle application, the overall efficiency of the vehicle may be improved by varying the displacement of the pump to match the requirements of the vehicle. For example, if the vehicle requires less pressurized fluid, the angle of the swashplate may be changed to decrease the stroke length of the pistons. If the vehicle requires more pressurized fluid, the angle of the swashplate may be changed to increase the stroke length of the piston.

A vehicle or system may include a control system that monitors one or more operating requirements and controls the operation of the pump to match the requirements. To effectively match the output of the pump with the requirements of the vehicle or system, the control system monitors an output of the pump.

One method of monitoring the output of the pump is described in U.S. Pat. No. 4,510,750 (the '750 patent) to Izumi et al. The '750 patent describes a circuit pressure control system for hydrostatic power transmission. The control system adjusts a tilt angle of a swashplate of a hydraulic pump, thereby adjusting a pressure in a circuit interconnecting the hydraulic pump and a hydraulic motor. The control system determines a swashplate tilt command based on a measured circuit pressure and a preset pressure value. The swashplate tilt command is then compared to a measured swashplate tilt angle. The difference between the measured and commanded swashplate tilt angle is used to determine an operating current that is supplied to a servo valve. The servo valve controls a displacement adjusting mechanism that adjusts the tilt angle of the swashplate, thereby adjusting the circuit pressure.

Although the control system of the '750 patent may control the circuit pressure, it may be complex because it determines the operating current based on the measured swashplate tilt angle. Therefore, the control system of the '750 patent includes a swashplate tilt angle detector. Furthermore, the control system determines the operating current based on the difference between the measured and commanded swashplate tilt angles. Therefore, the control system determines the tilt angle of the swashplate in order to adjust the circuit pressure.

The disclosed system is directed to overcoming one or more of the problems set forth above.

SUMMARY OF THE INVENTION

In one aspect, the present disclosure is directed to a method of controlling a motor. The method includes monitoring a pressure in a circuit supplying a pressurized fluid to the motor, determining a difference between the monitored circuit pressure and a desired circuit pressure, and determining an actuator command for an actuator that is capable of adjusting a pressure of the pressurized fluid supplied to the motor. The actuator command is determined based on the difference between the monitored circuit pressure and the desired circuit pressure, and is independent of a position of the actuator. The method also includes operating the actuator based on the actuator command.

In another aspect, the present disclosure is directed to a method of controlling a motor that includes monitoring a pressure in a circuit supplying a pressurized fluid to the motor, determining a difference between the monitored circuit pressure and a desired circuit pressure, and determining an actuator command for an actuator that is capable of adjusting a pressure of the pressurized fluid supplied to the motor. The actuator command is at least one of a force command and a pressure command that is based on the difference between the monitored circuit pressure and the desired circuit pressure. The method also includes operating the actuator based on the actuator command.

In yet another aspect, the present disclosure is directed to a system for controlling a motor. The system includes a pump coupled to the motor. The pump is operable to supply pressurized fluid to the motor and is connected to an actuator for controlling an operation of the pump. The system also includes at least one pressure sensor configured to monitor a pressure of the pressurized fluid supplied to the motor, and a controller coupled to the pump and the at least one pressure sensor. The controller is configured to receive a measured fluid pressure value from the at least one pressure sensor and determine a difference between the measured pressure value and a desired pressure value. The controller is also configured to determine an actuator command for the actuator based on the difference between the measured pressure value and the desired pressure value, and is independent of a position of the actuator. The controller is further configured to operate the actuator based on the actuator command.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
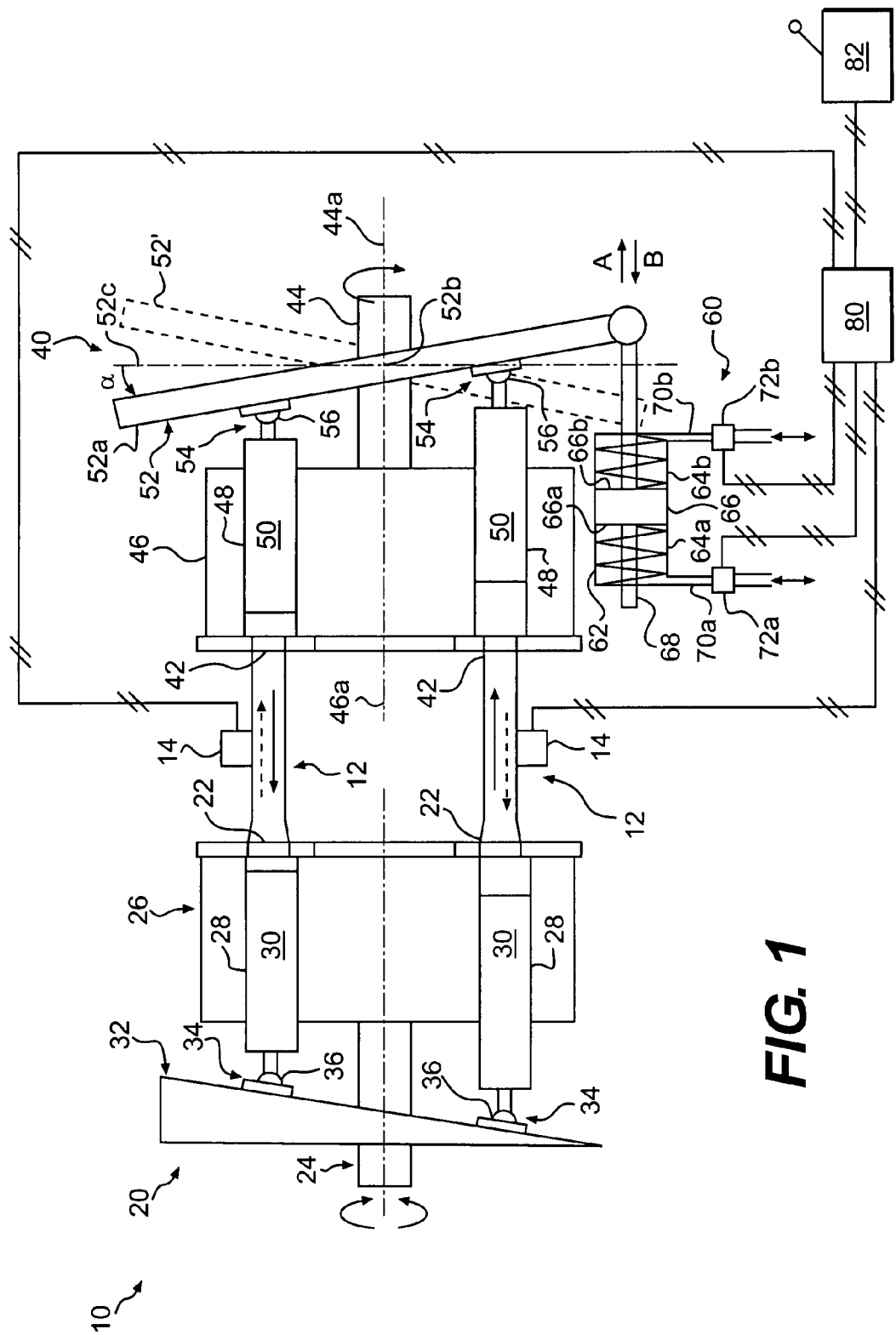
FIG. 1 is a schematic and diagrammatic illustration of a hydraulic system including a variable displacement pump and a hydrostatic motor according to an exemplary embodiment of the present invention.

FIG. 1 schematically and diagrammatically illustrates a hydraulic system 10 according to an exemplary embodiment of the present disclosure. The hydraulic system 10 may be provided in a machine (not shown), such as an excavator, a loader, or any other piece of equipment utilizing a hydraulic system 10. The exemplary hydraulic system 10 includes a hydrostatic motor 20 and a variable displacement pump 40.

The motor 20 is in fluid communication with the pump 40 via common fluid rails 12. The common fluid rails 12 supply fluid, such as high pressure fluid, from the pump 40 to the motor 20, and return the fluid from the motor 20 to the pump 40. The motor 20 may include motor ports 22, an output drive shaft 24, a rotatable cylinder barrel 26 having multiple piston bores 28, and pistons 30 held against a fixed swashplate 32. A piston 30 is slidably disposed in each of the bores 28. Each piston 30 may be held against the swashplate 32 using, for example, a fixed clearance device or a positive force hold-down mechanism through a slipper 34. The slipper 34 includes a joint 36, such as, for example, a ball and socket joint, and is disposed between each piston 30 and the swashplate 32. Each joint 36 allows for relative movement between the swashplate 32 and each piston 30. The output drive shaft 24 is coupled to a load (not shown) and transmits an output torque to the load.

The pump 40 is typically driven by a power source (not shown), such as an engine (e.g., an internal combustion engine, an electrical motor, etc.) via a drive train (not shown). The pump 40 may include pump ports 42, a drive shaft 44, a rotatable cylinder barrel 46 having multiple piston bores 48, and pistons 50 held against a tiltable swashplate 52. A piston 50 is slidably disposed in each of the bores 48. The swashplate 52 has a driving surface 52a, and each piston 50 is biased into engagement with the driving surface 52a. Each piston 50 may be held against the swashplate 52 using, for example, a fixed clearance device or a positive force hold-down mechanism through a slipper 54. The slipper 54 includes a joint 56, such as, for example, a ball and socket joint, and is disposed between each piston 50 and the swashplate 52. Each joint 56 allows for relative movement between the swashplate 52 and each piston 50.

The swashplate 52 of the pump 40 is tilted relative to a longitudinal axis 44a of the drive shaft 44, and the pistons 50 reciprocate within the piston bores 48 to produce a pumping action. The longitudinal axis 44a of the drive shaft 44 may be identical to a longitudinal axis 46a of the cylinder barrel 46 such that a rotation of the drive shaft 44 causes a corresponding rotation of the cylinder barrel 46. The drive shaft 44 may be driven by the engine.

The swashplate 52 of the pump 40 may be disposed at an angle $\alpha$ relative to the cylinder barrel 46. In the exemplary embodiment, the joints 56 allow the swashplate angle $\alpha$ to be varied by allowing the swashplate 52 to rotate about a swashplate axis 52b (extending out of the page, as shown in FIG. 1). For the purposes of the present disclosure, the swashplate angle $\alpha$ is measured from a line 52c that is perpendicular to the longitudinal axis 46a of the cylinder barrel 46, as shown in FIG. 1. One skilled in the art will recognize, however, that the swashplate angle $\alpha$ may be measured using a different reference line.

When the cylinder barrel 46 of the pump 40 is rotated, the combination of the angled driving surface 52a of the swashplate 52 and the force of the pressurized fluid in each bore 48 will drive each piston 50 through a reciprocating motion within each bore 48. When the piston 50 is moving under the force of the pressurized fluid and away from the associated pump port 42, fluid is allowed to enter the bore 48. When the piston 50 is moving towards the associated pump port 42 under the force of the driving surface 52a of the swashplate 52, the piston 50 acts on the fluid in the bore 48 to force the fluid to flow through the pump port 42 to the motor 20. A check valve (not shown) or other similar device, may be positioned in the pump port 42 to control the pressure at which fluid is released from the bore 48 to the motor 20.

The swashplate angle $\alpha$ controls the stroke length of each piston 50 and a displacement rate of the pump 40. Increasing the swashplate angle $\alpha$ may result in a greater stroke length of each piston 50. Conversely, reducing the swashplate angle $\alpha$ may result in a reduced stroke length of each piston 50. An increase in the stroke length of each piston 50 may increase the amount of fluid that is pressurized in the bores 48 to a predetermined level during each rotation of the cylinder barrel 46. A decrease in the stroke length of each piston 50 may decrease the amount of fluid that is pressurized in the bores 48 to a predetermined level during each rotation of the cylinder barrel 46.

The pump 40 may also include a mechanism to vary the swashplate angle $\alpha$. In the exemplary embodiment shown in FIG. 1, the mechanism is a hydraulic actuator 60, such as a double-acting hydraulic cylinder. One skilled in the art will recognize, however, that another type of mechanism, such as, for example, another type of hydraulically-controlled mechanism, a solenoid driven actuator, etc., may be used to vary the swashplate angle $\alpha$.

The hydraulic actuator 60 includes a housing 62 including a pair of actuating chambers, such as a first actuating chamber 64a and a second actuating chamber 64b. The first and second actuating chambers 64a, 64b are separated by a work element or piston 66 connected to a piston rod 68. A sealing member (not shown), such as an o-ring, may be connected to the piston 66 to restrict a flow of fluid between an internal wall of the housing 62 and an outer cylindrical surface of the piston 66. Pressurized fluid may be communicated to and from the first and second actuating chambers 64a, 64b via a first conduit 70a and a second conduit 70b, respectively.

A first valve 72a may be disposed in fluid communication with the first conduit 70a, and a second valve 72b may be disposed in fluid communication with the second conduit 70b. The first and second valves 72a, 72b may be, for example, proportional directional control valves. However, the invention is not limited to directional control valves, and the first and second valves 72a, 72b may be any other suitable valves known to those skilled in the art, such as single spool valves, independent metering valves, etc.

The piston 66 of the hydraulic actuator 60 may include a first hydraulic surface 66a and a second hydraulic surface 66b opposite the first hydraulic surface 66a. An imbalance of force caused by fluid pressure on the first and second hydraulic surfaces 66a, 66b may result in movement of the piston 66 with respect to the housing 62 of the hydraulic actuator 60. For example, a force on the first hydraulic surface 66a that is greater than a force on the second hydraulic surface 66b may cause the piston 66 to displace in a first direction A. The piston rod 68 is also displaced in the first direction A, thereby causing the swashplate 52 to rotate in one direction with respect to the swashplate axis 52b. Similarly, when a force on the second hydraulic surface 66b is greater than a force on the first hydraulic surface 66a, the piston 66 may be displaced in a second direction B. The piston rod 68 is also displaced in the second direction B, thereby causing the swashplate 52 to rotate in an opposite direction with respect to the swashplate axis 52b.

As a result, the pressures in the respective first and second actuating chambers 64a, 64b may be controlled to adjust the swashplate angle α. By increasing the pressure in the first actuating chamber 64a and/or decreasing the pressure in the second actuating chamber 64b, the force exerted by the piston 66 and the piston rod 68 on the swashplate 52 may increase the swashplate angle α with respect to reference line 52c. By decreasing the pressure in the first actuating chamber 64a and/or increasing the pressure in the second actuating chamber 64b, the force exerted by the piston 66 and the piston rod 68 on the swashplate 52 may decrease the swashplate angle α with respect to reference line 52c, for example, as shown by the swashplate 52' illustrated by dashed lines.

A controller 80 may be provided to control the first and second valves 72a, 72b to thereby control the swashplate angle α and the output torque and/or speed of the motor. The controller 80 may include an electronic control module (ECM) (not shown) that has a microprocessor and a memory. As is known to those skilled in the art, the memory is operatively connected to the microprocessor and stores an instruction set and variables. Associated with the microprocessor and part of the ECM are various other known circuits such as, for example, power supply circuitry, signal conditioning circuitry, solenoid driver circuitry, etc. The controller 80 may be connected to at least one operator input device 82 that allows an operator to input an operator input command using one or more control devices known in the art, such as one or more pedals, switches, dials, paddles, joysticks, etc. The operator input command may indicate an expected or desired output torque and/or speed of the motor 20, for example, to produce a steady-state ground speed of the machine.

The hydraulic system 10 may include one or more pressure sensors 14 electrically coupled to the controller 80. The pressure sensors 14 of the exemplary hydraulic system 10 shown in FIG. 1 are provided in the common fluid rails 12 supplying fluid to and from the motor 20 and the pump 40. However, the number and locations of the pressure sensors 14 are not limited to the specific arrangement illustrated in FIG. 1. The pressure sensors 14 may be placed at any location suitable to determine one or more circuit pressures in the hydraulic system 10, such as one or more of the circuit pressures in the common fluid rail 12 returning fluid from the motor 20 to the pump 40, the common fluid rail 12 supplying fluid from the pump 40 to the motor 20, one or more of the piston bores 28 of the motor 20, and/or one or more of the piston bores 48 of the pump 40. The pressure sensors 14 may include any pressure sensor assembly capable of ascertaining a pressure of the fluid flowing in one or more of the common fluid rails 12 and/or piston bores 28, 48.

Figure 2:
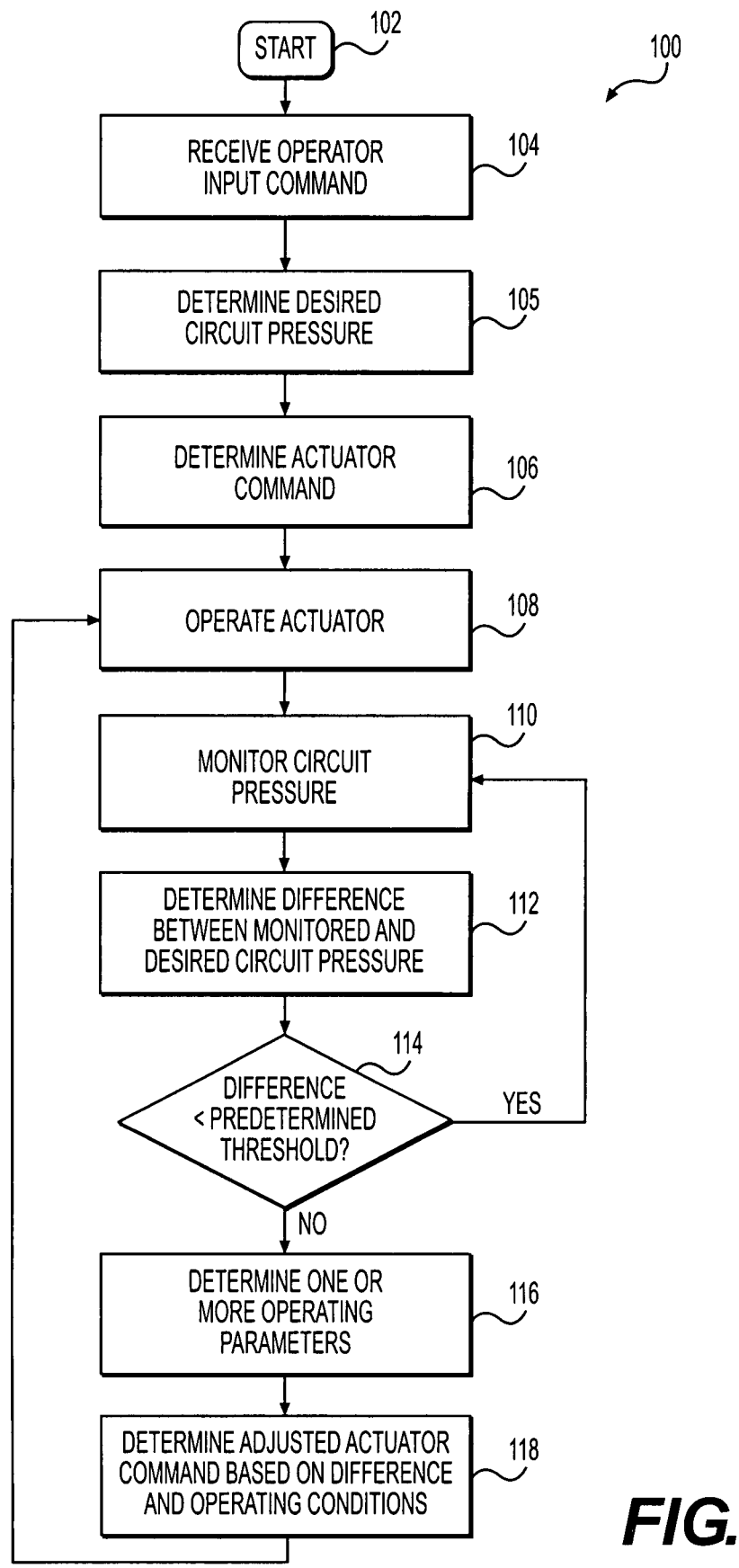
FIG. 2 is a flow chart of a method of controlling hydraulic system using a feedback pressure in accordance with an exemplary embodiment of the present disclosure.

FIG. 2 illustrates a flow chart showing an exemplary method 100 of controlling the hydraulic actuator 60 based on the monitored circuit pressure. The method 100 of controlling the hydraulic actuator 60 starts at step 102 and proceeds to step 104 where the controller 80 receives from the operator input device 82 the operator input command indicating, for example, the desired output torque and/or speed of the motor 20.

Next, in step 105, the controller 80 determines a desired (or expected) circuit pressure in the common fluid rails 12. The desired circuit pressure may be determined based on the operator input command received via the operator input device 82. The desired circuit pressure may also be determined as a function of one or more characteristics of the hydraulic system 10, such as the physical characteristics of the motor 20, e.g., displacement, pressure, efficiency, etc.

Control then continues to step 106 where the controller 80 determines an actuator command. In the exemplary embodiment, the actuator command is a pressure command indicating the desired pressure in the first actuating chamber 64a and/or the second actuating chamber 64b. Alternatively, the actuator command may be a force command indicating a desired force on the piston 66 in the actuator 60. The controller 80 may then determine current command(s) supplied to the first valve 72a and/or the second valve 72b based on the pressure command (or force command). In yet another alternative, the actuator command may be the current command(s) supplied to the first valve 72a and/or the second valve 72b.

In step 108, the controller 80 uses the actuator command to operate the actuator 60, e.g., by sending current command(s) to the first valve 72a and/or second valve 72b based on the pressure (or force) command. As a result, the pressures in the respective first and second actuating chambers 64a, 64b may be adjusted, thereby adjusting the swashplate angle α, which may result in a change in the output torque and/or speed of the motor 20.

In step 110, the controller 80 receives a measured circuit pressure from the pressure sensors 14. The exemplary hydraulic system 10 shown in FIG. 1 includes multiple pressure sensors 14. However, it is to be understood that the measured circuit pressure may be received from one of the pressure sensors 14 or may be determined based on measurements from a plurality of pressure sensors 14.

In step 112, the controller 80 determines a difference between the measured circuit pressure determined in step 110 and the desired circuit pressure determined in step 105. Then, in step 114, the controller 80 determines if the difference between the measured circuit pressure and the desired circuit pressure is below a predetermined threshold. If so (step 114; yes), then control returns to step 110, and the controller 80 continues monitoring the circuit pressure (step 110) and determining whether the difference between the monitored and desired circuit pressure is below the predetermined threshold (step 112). The desired circuit pressure may change, e.g., if the operator inputs a new operator input command via the operator input device 82.

If the difference between the measured circuit pressure and the desired circuit pressure is not below the predetermined threshold (step 114; no), then control proceeds to step 116, and the controller 80 determines one or more operating parameters. The controller 80 may be programmed to control the operation of the actuator 60 based on different operating parameters relating to the machine or the hydraulic system 10 in particular. The controller 80 may control the first and second valves 72a, 72b based on different operating parameters.

In step 118, the controller 80 adjusts the actuator command determined in step 106 based on the difference between the measured and desired circuit pressures and the measured operating parameters. The controller 80 may be programmed with one or more mappings. The mappings may be created through experimentation and may relate an actuator command adjustment to one or more of the operating parameters. The operating parameters may include, but are not limited to, pump speed, engine (or input) speed, motor speed, motor torque, etc. Optionally, the operating parameters may also include actuator position and/or velocity, fluid viscosity and/or temperature, etc. Other operating parameters relating to the hydraulic system 10 and the machine may be used. However, it is to be understood that the actuator command may be adjusted without having to determine position and/or velocity of the actuator piston 66.

Figure 3:
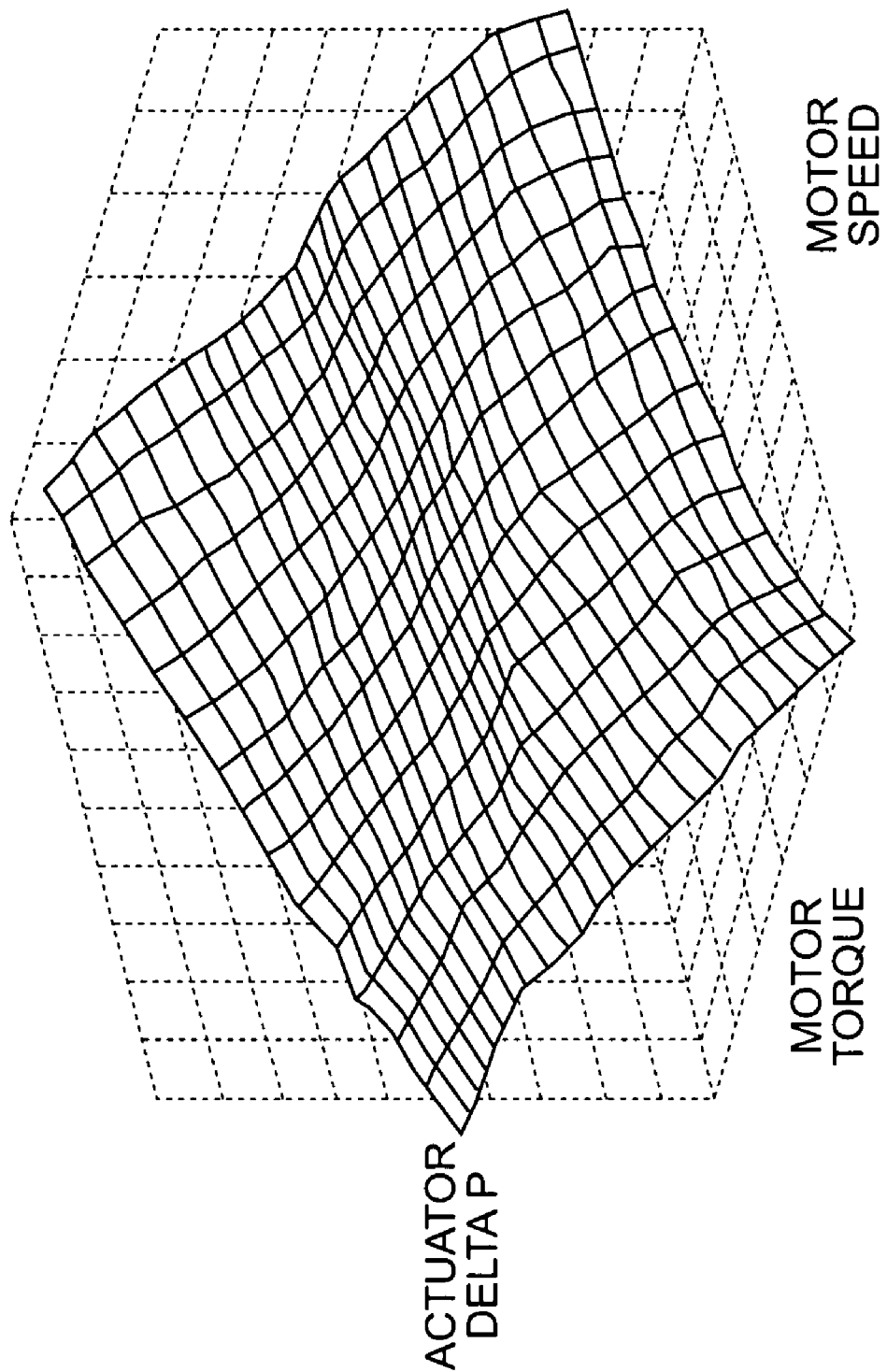
FIG. 3 is a graph illustrating a relationship between an adjustment in a difference in actuating chamber pressures, a motor torque, and a motor speed in accordance with an exemplary embodiment of the present disclosure.

FIG. 3 illustrates an exemplary relationship between an adjustment in a difference in actuating chamber pressures (i.e., the difference between the pressure in the first actuating chamber 64a and the pressure in the second actuating chamber 64b), motor torque, and motor speed. The adjustment in a difference in actuating chamber pressures may be determined using the mapping of FIG. 3 based on the motor torque and motor speed. Other mappings may be used to determine the adjustment in actuating chamber pressures based on other operating parameters.

Control then returns to step 108. In step 108, the controller 80 uses the adjusted actuator command to operate the actuator 60 based on the adjusted actuator command, e.g., by sending current command(s) to the first valve 72a and/or second valve 72b based on the adjusted pressure (or force) command for adjusting the pressures in the respective actuating chambers 64a, 64b. As a result, the pressures in the respective first and second actuating chambers 64a, 64b may be adjusted, thereby adjusting the swashplate angle α, which may result in a change in the output torque and/or speed of the motor 20. Control then proceeds to step 110, and the controller 80 continues monitoring the circuit pressure (step 110) and determining whether the difference between the monitored and desired circuit pressure is below the predetermined threshold (step 112).

INDUSTRIAL APPLICABILITY

The disclosed method and system for feedback pressure control may be applicable to any machine that includes a hydraulic system. The disclosed method and system for feedback pressure control may determine a command for controlling an operation of an actuator based on the measured (feedback) circuit pressure without having to determine a position or velocity of the actuator. The operation of method and system for feedback pressure control will now be explained.

The movable swashplate 52 of the pump 40 of the hydraulic system 10 is positioned at the swashplate angle α using the hydraulic actuator 60 that is controlled using the first and second valves 72a, 72b. The first and second valves 72a, 72b control the pressure of the fluid delivered to respective actuating chambers 64a, 64b on opposite sides of the piston 66 and adjust the swashplate torque about the swashplate axis 52b. Controlling the swashplate torque varies the pressure of the fluid delivered to the motor 20, thereby adjusting the output torque of the motor 20. As a result, the controller 80 determines an actuator force and/or pressure command and does not determine an actuator displacement and/or velocity command, thereby allowing for a simpler method of controlling the hydraulic system 10.

The circuit pressure of the hydraulic system 10 may be monitored using one or more of the pressure sensors 14. The measured circuit pressure may be compared to the desired circuit pressure, which is determined from the desired motor output torque, which is determined based on the operator input. The current command(s) to the first and second valves 72a, 72b may be adjusted to adjust the pressure(s) in the respective actuating chambers 64a, 64b, thereby adjusting the swashplate 52 such that the circuit pressure may reach the desired circuit pressure. Thus, the disclosed method 100 of controlling the hydraulic actuator 10 is an open loop control algorithm that determines the appropriate pressure command (s) for the respective actuating chambers 64a, 64b and/or appropriate current command(s) to the respective first and second valves 72a, 72b. As a result, the hydraulic system 10 does not require the additional hardware for determining a position or velocity of the actuator piston 66, such as a position sensor, velocity sensor, or a servo-feedback mechanism. Furthermore, the controller 80 does not require additional information such as an actuator position or velocity measurement for determining the appropriate commands for operating the actuator 60. The resulting system for controlling the hydraulic system 10 may be less expensive and less complex.

Since the torque of the pump swashplate 52 depends on the pressure in the respective actuating chambers 64a, 64b, the swashplate 52 does not necessarily move toward a neutral position to reach the desired circuit pressure in the hydraulic system 10. Instead, the controller 80 may adjust the desired pressure for the respective actuating chambers 64a, 64b based on various factors that are independent of the position and/or velocity of the actuator 60, e.g., the difference between the desired and measured circuit pressure, the desired motor output torque, motor speed, pump speed, and/or engine speed.

It will be apparent to those skilled in the art that various modifications and variations can be made to the method and system for feedback pressure control. Other embodiments will be apparent to those skilled in the art from consideration of the specification and practice of the disclosed method and system for feedback pressure control. It is intended that the specification and examples be considered as exemplary only, with a true scope being indicated by the following claims and their equivalents.

What is claimed is:

1. A method of controlling a motor, comprising:
    monitoring a pressure in a circuit supplying a pressurized fluid to the motor;
    determining a difference between the monitored circuit pressure and a desired circuit pressure;
    determining an actuator command for an actuator that is capable of adjusting a pressure of the pressurized fluid supplied to the motor, the actuator command being independent of a position of the actuator;
    operating the actuator based on the actuator command;
    where the actuator command relates to at least one of a desired pressure in the actuator and a desired force acting on a piston of the actuator;

determining whether the difference between the monitored circuit pressure and the desired circuit pressure is above a threshold; and determining an adjusted actuator command based on at least one operating parameter of at least one of a pump and the motor when the difference between the monitored circuit pressure and the desired circuit pressure is above the threshold.

2. The method of claim 1, wherein the actuator command and the adjusted actuator command are determined independent of a velocity of the actuator.

3. The method of claim 1, wherein the at least one operating parameter includes at least one of a motor speed, a pump speed, and a desired motor output torque.

4. The method of claim 1, wherein the adjusted actuator command is determined using a stored mapping for determining the adjusted actuator command based on the at least one operating parameter.

5. The method of claim 1, further including displacing a swashplate of the pump based on the actuator command using the actuator, the pump supplying the pressurized fluid to the motor.

6. The method of claim 1, wherein the actuator command is determined based on the difference between the monitored circuit pressure and the desired circuit pressure.

7. A system for controlling a motor, comprising:
a pump coupled to the motor, the pump being operable to supply pressurized fluid to the motor;
an actuator connected to the pump, the actuator being configured to control an operation of the pump;
at least one pressure sensor configured to monitor a pressure of the pressurized fluid supplied to the motor; and
a controller coupled to the pump and the at least one pressure sensor, the controller being configured to:
receive a measured fluid pressure value from the at least one pressure sensor;
determine a difference between the measured pressure value and a desired pressure value;
determine an actuator command for the actuator based on the difference between the measured pressure value and the desired pressure value, the actuator command being independent of a measured position and a prior commanded position of the actuator;
operate the actuator based on the actuator command; and
where the actuator command relates to at least one of a desired pressure in the actuator and a desired force acting on a piston of the actuator.

8. The system of claim 7, wherein the controller determines the actuator command independent of a velocity of the piston of the actuator.

9. The system of claim 7, wherein the pump includes a swashplate, and a tilt angle of the swashplate depends on at least one of a position and a velocity of the piston of the actuator controllable based on the actuator command; and the actuator command is independent of the tilt angle of the swashplate.

10. The system of claim 7, wherein the controller determines the actuator command based on at least one operating parameter of at least one of a pump and the motor.

11. The system of claim 10, wherein the controller determines the actuator command based on at least one of a motor speed, a pump speed, and a desired motor output torque.

12. The system of claim 7, wherein the controller stores at least one mapping for determining the actuator command based on at least one operating parameter of at least one of the pump and the motor.

* * * * *